(12) United States Patent
Strange

(10) Patent No.: US 12,372,068 B2
(45) Date of Patent: Jul. 29, 2025

(54) GEOTHERMAL DESALINATION AND PUMPING SYSTEM

(71) Applicant: GOOD WATER ENERGY LTD, Claremont (AU)

(72) Inventor: Warren Ross Strange, Claremont (AU)

(73) Assignee: GOOD WATER HOLDINGS PTY LTD, Western Australia (AU)

( * ) Notice: Subject to any disclaimer, the term of this patent is extended or adjusted under 35 U.S.C. 154(b) by 0 days.

(21) Appl. No.: 18/276,825

(22) PCT Filed: Feb. 9, 2022

(86) PCT No.: PCT/AU2022/050078
§ 371 (c)(1),
(2) Date: Aug. 10, 2023

(87) PCT Pub. No.: WO2022/170386
PCT Pub. Date: Aug. 18, 2022

(65) Prior Publication Data
US 2024/0392757 A1      Nov. 28, 2024

(30) Foreign Application Priority Data

Feb. 10, 2021 (AU) ................................ 2021100825
Feb. 10, 2021 (AU) ................................ 2021100827
(Continued)

(51) Int. Cl.
*F03G 4/00* (2006.01)
*C02F 1/04* (2023.01)

(52) U.S. Cl.
CPC ................ *F03G 4/001* (2021.08); *C02F 1/04* (2013.01); *F03G 4/029* (2021.08); *C02F 2303/10* (2013.01)

(58) Field of Classification Search
CPC .. F03G 4/001; F03G 4/029; C02F 1/04; C02F 2303/10
(Continued)

(56) References Cited

U.S. PATENT DOCUMENTS 7,845,406 B2 * 12/2010 Nitschke ................. E21B 43/40
166/266
10,987,609 B1 * 4/2021 Walker ...................... C02F 1/14
(Continued)

OTHER PUBLICATIONS

International Search Report for related International Application No. PCT/AU2022/050078; action dated Aug. 18, 2022; (4 pages).
(Continued)

*Primary Examiner* — Hoang M Nguyen
(74) *Attorney, Agent, or Firm* — K&L Gates LLP

(57) ABSTRACT

The present disclosure is directed to a geothermal desalination system, comprising; a primary liquid circuit circulating a liquid into a geothermal well and returning heated liquid from a well head of the geothermal well, the primary liquid circuit passing through a desalination plant; a first turbine driven by the heated liquid to produce a mechanical output; and an air compressor driven from the mechanical output to provide a first compressed air supply and a second compressed air supply, wherein the first compressed air supply drives a supply pump to supply salt water to the desalination plant, and the second compressed air supply drives a-start-up pump to initiate circulation in the primary liquid circuit.

33 Claims, 8 Drawing Sheets

(30)  Foreign Application Priority Data

Feb. 10, 2021 (AU) ................................ 2021900321
Feb. 10, 2021 (AU) ................................ 2021900322

(58) Field of Classification Search
USPC ............................................. 60/641.2–641.4
See application file for complete search history.

(56)  References Cited

U.S. PATENT DOCUMENTS

| | | |
|---|---|---|
| 2002/0178723 A1 | 12/2002 | Bronicki et al. |
| 2006/0137349 A1* | 6/2006 | Pflanz ................. F28D 20/0052 60/641.2 |
| 2013/0299123 A1 | 11/2013 | Matula |
| 2016/0288012 A1 | 10/2016 | Zeitoun et al. |
| 2019/0093641 A1 | 3/2019 | Sumrall |
| 2019/0390660 A1* | 12/2019 | McBay .................. F24T 10/20 |
| 2023/0294014 A1* | 9/2023 | Walker ................... F24S 10/70 202/174 |

OTHER PUBLICATIONS

Written Opinion for related International Application No. PCT/AU2022/050078; action dated Aug. 18, 2022; (4 pages).

\* cited by examiner

GEOTHERMAL DESALINATION AND PUMPING SYSTEM

CROSS-REFERENCE TO RELATED APPLICATIONS

This application is the National Stage filing under 35 U.S.C. 371 of International Application No. PCT/AU2022/050078, filed on Feb. 9, 2022, which claims the benefit of earlier filing date and right of priority to Australian Application No. 2021100825 filed on Feb. 10, 2021, Australian Application No. 2021100827 filed on Feb. 10, 2021, Australian Application No. 2021900321 filed on Feb. 10, 2021, and Australian Application No. 2021900322 filed on Feb. 10, 2021 the contents of which are all hereby incorporated by reference herein in their entirety.

FIELD

The disclosure is directed to a geothermal desalination system. The disclosure also relates to a combined geothermal desalination and salt water delivery system, and further to a geothermal desalination and pumping system. The disclosure is additionally directed to a method of feeding salt water to a desalination plant using compressed air powered by geothermal energy.

BACKGROUND

Australia is getting hotter and drier and as a result fresh water is getting scarce. Additionally, people are becoming more environmentally aware and are seeking cleaner and greener products.

While solar and wind energy have low emissions, they cannot presently deliver affordable baseload electricity. In contrast, geothermal power can provide limitless, zero-emission, baseload energy but drilling costs have historically made it expensive to do so, and restricted its use to locations where high temperatures are at shallow depth.

Previous attempts at large scale geothermal power in Australia were thwarted by high drilling costs and both technological and environmental problems using conventional oil and gas drilling techniques. However, the ability to harness deep thermal heat and to utilise this energy to provide low cost desalination, heating, cooling or pumping with or without electricity generation is highly desirable.

Zero-emission electricity and water can be used to produce 'green' hydrogen, at lower costs than solar/battery produced green hydrogen. Green hydrogen is a desirable liquid fuel and a potential clean energy storage solution of the future. Additionally, desalination of salt water can also produce valuable by-products like high quality salt, potash and other minerals.

People typically link geothermal power to countries such as New Zealand, Indonesia and the Philippines which are geologically active and where drilling to 2000 metres or less is sufficient to provide access to the high temperatures required to produce usable energy. However, it would be desirable to drawn on geothermal energy to produce freshwater anywhere in the world.

It is estimated that an 8000 m well drilled in most parts of Australia and other countries with older and cooler geology that is not heated by volcanic activity but is heated by radiating heat from bedrock such as granite could be capable of supplying enough steam to generate 4 MW of base-load electricity which would meet the demand of 2500 homes. The cost of this power is calculated to be competitive with existing fossil-fuel power generating stations while producing zero emissions. The only waste product is heat which can be used to support a whole range of spin-off industries including water desalination. After initial energy has been extracted from steam for power generation, there is still a significant amount of waste heat available, which normally would be discarded to the atmosphere in cooling towers.

The present disclosure was conceived with these shortcomings in mind.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

SUMMARY

In a first aspect the disclosure provides a geothermal desalination system, comprising; a primary liquid circuit circulating liquid into a geothermal well and returning heated liquid from a well head of the geothermal well, the primary liquid circuit passing through a desalination plant; a turbine driven by the heated liquid to produce a mechanical output; and an air compressor driven from the mechanical output to provide a first compressed air supply and a second compressed air supply, wherein the first compressed air supply drives a supply pump to supply salt water to the desalination plant, and the second compressed air supply drives a-start-up pump to initiate the primary liquid circuit.

In some embodiments the air compressor may provide a third compressed air supply to drive a brine pump to pump brine from the desalination plant.

In some embodiments the liquid in the primary liquid circuit may be water.

The desalination plant may be a multi-effect distillation (MED) desalination plant or a Reverse Osmosis (RO) desalination plant.

In some embodiments a portion of the heated liquid may be subject to pressure change to produce steam to drive the turbine. The heated liquid may be subject to pressure change in a separator or flash separator. A portion of the liquid in the primary liquid circuit may be outputted from the separator or flash separator and mixed with liquid in the primary circuit exhausted from the turbine to increase the temperature of the liquid in the primary liquid circuit.

The liquid in the primary liquid circuit is communicated to the desalination plant downstream of the turbine before returning to the geothermal bore to be reheated. In some embodiments, circulation of the primary liquid circuit once initiated by the start-up pump may be sustained by a thermal syphoning effect drawing liquid into the geothermal well at a first temperature as heated liquid is forced out of the well head at a second temperature, greater than the first temperature.

In some embodiments an air storage tank may be incorporated within at least one of the first and the second compressed air supplies, to store compressed air.

In some embodiments an air vacuum pump may be connected upstream of the air compressor, such that the air vacuum pump is driven by a flow of the ambient air drawn into the air compressor. A vacuum line may be connected to the vacuum pump, to drawn air from at least one chamber of the desalination plant.

The first compressed air supply may drive the supply pump located within a salt water bore. The supply pump may be an air pump. The compressed air forced from the supply pump may drive salt water from the salt water bore to an inlet in a first chamber of the desalination plant. The salt water may be sprayed into the first chamber of the desalination plant, heated by the flow of liquid from the primary liquid circuit passing therethrough.

In some embodiments, the turbine may be exchanged for a steam engine or a screw expander.

In a second aspect the disclosure provides a geothermal desalination and salt water delivery system, comprising: a primary liquid circuit circulating a liquid into a geothermal well and returning heated liquid from a well head of the geothermal well, the heated liquid being fed to a heat exchanger to heat a working medium of a secondary circuit passing through a desalination plant, wherein the heated working medium of the secondary circuit drives a first turbine to produce a mechanical output; and an air compressor driven from the mechanical output to provide a first compressed air supply and a second compressed air supply, wherein the first compressed air supply drives a supply pump, and the second compressed air supply drives a start-up pump to initiate the primary liquid circuit.

In some embodiments there is provided a third compressed air supply configured to drive a salt brine pump to pump slat brine from the desalination plant.

The air compressor may further provides a fourth compressed air supply to drive a circuit pump to circulate the working medium in the secondary circuit.

The liquid in the primary liquid circuit may be water. In some embodiments the working medium in the secondary circuit may be a binary fluid having a low-boiling point. The working medium may be N-Pentane. The working medium in the secondary circuit may be communicated to the desalination plant before returning to the heat exchanger to be re-heated.

In some embodiments the primary liquid circuit once initiated may be sustained by a thermal syphoning effect drawing liquid into the geothermal well at a first temperature as heated liquid is forced out of the well head at a second temperature, greater than the first temperature. The start-up pump and the circuit pump may be driven to initiate the liquid of the primary circuit and the working medium of the secondary circuit simultaneously. The start-up pump can be deactivated once the primary liquid circuit is moving as the thermal syphoning effect will provide a natural pumping action to maintain liquid movement in the primary liquid circuit.

A storage tank may be incorporated within at least one of the first, second, third or fourth compressed air supply, to store compressed air.

In some embodiments, an air vacuum pump may be connected to an intake of the air compressor, such that the air vacuum pump is driven by a flow of ambient air drawn through the vacuum pump into the air compressor. A vacuum line may be connected to the vacuum pump, to drawn air from at least one chamber of the desalination plant.

The first compressed air supply may drive the supply pump located within a salt water bore an ocean or a salt water dam. The supply pump may be an air pump. The compressed air forced from the supply pump may drive salt water from the salt water bore or ocean or salt water dam to an inlet in a first chamber of the desalination plant. The salt water may be sprayed into the first chamber of the desalination plant, heated by the flow of working medium in the secondary circuit passing therethrough.

Thermal heat drawn from the geothermal well is used to provide thermal heat energy to the desalination plant which will boil sea or salt water in a vacuum state inside of the MED desalination plant.

The disclosure uses a low enthalpy geothermal system to: (i) drive a desalination plant which delivers a sea or salt water supply from a salt water bore, the ocean or salt water storage dam or tank; and (ii) drive a vacuum system required in the desalination plant, without the need for additional electricity.

The primary liquid circuit is sustained by a thermal syphoning effect, providing a flow of the primary fluid to a surface of a deep geothermal well. The primary liquid can be water.

The thermal syphoning effect provides a flow of the primary liquid to the surface of a deep geothermal well. This effect occurs when liquid, or fresh water at a temperature of approximately 50° C. is drawn down an annulus of the geothermal well to be heated by the hot geology within the well. The thermal syphoning effect is responsible for pushing the heated water back to the surface of the well, where this delivery of thermal energy to the surface requires no energy input to maintain the thermal energy flow.

Typically, electricity is required to deliver sea or salt water to the MED or Reverse Osmosis (RO) desalination plant, the electricity being used to create a vacuum inside the chambers of the desalination plant where salt water is vaporised, and electricity is again used to pump the fresh water and the brine away from the MED plant.

The present disclosure utilises an air compressor driven by the thermal heat energy, to at least reduce (and in some cases eliminate) the requirement for additional electricity. This is achieved by using a screw expander, turbine or water wheel system that turns flow of the primary liquid (thermal energy from the fluid flow) into a mechanical output in the form of a rotary or piston force. This mechanical output can directly or indirectly drive an air compressor to power air pumps or alternatively can be used to drive a generator for electricity generation.

The air compressor utilises the suction side of the compressor (intake) to create a vacuum within the chambers of the MED plant, and the pressure side of the compressor (output) provides compressed air that it used to drive one or more air pumps. The one or more air pumps are used to deliver salt water to the MED plant, whether from a salt water bore (beach or inland), from a storage tank or dam, or from the ocean.

Additional pumps driven from the compressed air source can be used to start and/or assist in the circulation of the primary and/or secondary fluid circuit urging water through the geothermal well to harvest thermal energy to drive the circuit. In one embodiment, a secondary pump can be integrated into the primary liquid circuit to facilitate the start-up of the thermal syphoning effect. This pump may be an air pump or an air driven pump.

The use of air pumps provides advantages in that there are no moving parts that can corrode in salt water. This provides an advantage in reliability of the system and longevity of the system and reduces maintenance costs. It is also more energy efficient to directly drive an air compressor to create both a vacuum and to move salt water to and from the MED plant, than it is to use or generate electricity for these purposes.

From a safety perspective, the present disclosure also provides advantages in reducing (and in some cases eliminating) the use of dangerous electricity in the environment of salt water.

The disclosure uses a screw expander, turbine, ORC turbine, engine, steam engine or water wheel that converts energy from the liquid in the primary liquid circuit (thermal energy from the flowing fluid) into a mechanical output in the form of a rotary or piston force. This mechanical output can directly or indirectly drive a pump, or a compressor or alternatively can be used to drive a generator for electricity generation.

The disclosure provides lower operating costs for water pumping, when compared to conventional pumps driven by electricity.

The geothermal desalination systems of the present disclosure create zero emissions, as geothermal energy is used to provide all energy and pumping requirements. Thermal Syphoning provides thermal energy with no well pumping required once the primary fluid circuit is running, providing low-cost renewable energy.

It is calculated that 100 to 500 horsepower of pumping energy could be obtained from one single geothermal well, and this energy source is almost constant as opposed to solar or wind energy which can fluctuate greatly depending on the time of day and the time of the year.

Additional comparisons with both wind and solar power shows geothermal energy to have a very small physical footprint, thus leaving surrounding land untouched, and available for alternative use. Additionally, this greatly reduces the environmental impact of the geothermal desalination system as there is no requirement for power lines, clearing of trees, no emissions and no toxic waste produced and the land above and around the geothermal bore can be rehabilitated after installation. Geothermal desalination and pumping is also resistant to weather events and bush fire risk.

The present disclosure provides additional advantages in that there is minimal well or pump maintenance required, no power line maintenance or power losses through long distance transmission, and no solar panels to dust. The use of steam engines and steam expanders has a long life and a track record for proven reliability, known examples operating for up to 100 years.

Once drilled and installed a single geothermal well will produce for hundreds of years while the well head flow can be controlled remotely to adjust the pumping volumes achieved.

The above advantages provide for significant reductions in typical desalination and pumping costs and significant reductions in $CO_2$ emissions.

Geothermal desalination and pumping systems, driven from single well geothermal energy systems using the thermal syphoning effect, do not produce the plastic waste that is normally generated by RO desalination plants. Additionally, these geothermal energy systems do not produce $CO_2$ emissions, do not produce toxic waste from the regular disposal of solar panels and wind turbine blades, do not require additional electricity generation and transmission, and have much lower negative impacts on the environment. It is calculated that a geothermal desalination and pumping system could produce fresh water up to 8 times cheaper than an RO desalination system whether driven from fossil fuel or electricity generated from solar, wind, or battery fed systems.

In a third aspect the disclosure provides a geothermal desalination and pumping system, comprising; a primary liquid circuit circulating liquid into a geothermal well and returning heated liquid from a well head of the geothermal well, the primary liquid circuit passing through a desalination plant; a first turbine driven by the heated liquid to produce a first mechanical output; an air compressor driven from the first mechanical output to provide a first compressed air supply and a second compressed air supply, wherein the first compressed air supply drives a supply pump to supply salt water to the desalination plant, and the second compressed air supply drives a start-up pump to initiate the primary liquid circuit, and a second turbine driven by the heated liquid to produce a second mechanical output, wherein the second mechanical output drives a fresh water pump, pumping fresh water from the desalination plant to a delivery outlet.

In some embodiments, the air compressor may provide a third compressed air supply configured to pump salt brine from the desalination plant. The liquid in the primary liquid circuit may be water.

In some embodiments, a portion of the heated liquid may be subject to pressure change to produce vapour to drive the first turbine and the second turbine. The heated liquid may be subject to pressure change in a separator or flash separator.

In some embodiments, a portion of the liquid in the primary liquid circuit may be outputted from a first flash separator and mixed with liquid in the primary circuit exhausted from the first turbine to increase the temperature of the liquid in the primary liquid circuit. In some embodiments, a portion of the liquid in the primary liquid circuit may be outputted from a second flash separator and mixed with liquid in the primary circuit exhausted from the second turbine to increase the temperature of the liquid in the primary liquid circuit.

The liquid in the primary liquid circuit may be communicated to the desalination plant downstream of each of the first and second turbines before returning to the geothermal bore to be reheated.

In some embodiments, circulation of the primary liquid circuit once initiated by the start-up pump may be sustained by a thermal syphoning effect drawing liquid into the geothermal well at a first temperature as heated liquid is forced out of the well head at a second temperature, greater than the first temperature.

An air storage tank may be incorporated within at least one of the first, second and the third compressed air supply, to store compressed air.

In some embodiments, an air vacuum pump may be connected to an intake of the air compressor, such that the air vacuum pump is driven by a flow of ambient air drawn through the vacuum pump into the air compressor. A vacuum line may be connected to the vacuum pump, to drawn air from at least one chamber of the desalination plant.

The first compressed air supply may drive the supply pump located within a salt water bore, or the ocean or a salt water storage tank of dam. The supply pump may be an air pump.

In some embodiments, the compressed air forced from the supply pump may drive salt water from the salt water bore, or ocean or storage tank or dam to an inlet in a first chamber of the desalination plant. The salt water may be sprayed into the first chamber of the desalination plant, heated by the flow of liquid from the primary liquid circuit passing therethrough.

In some embodiments, at least one of the first turbine and the second turbine may be exchanged for a steam engine or a screw expander.

In some embodiments there is additionally provided a third compressed air supply configured to drive a brine pump to deliver salt brine away from the desalination plant.

The geothermal desalination and pumping system of the disclosure provides all of the advantages set-out above in relation to the geothermal desalination system, including zero emissions, reduced installation costs and maintenance costs, long usable life-span, comparatively small physical footprint (as compared to wind or solar), no toxic waste, and a reliable, steady long term energy supply.

In a fourth aspect the disclosure provides a method of feeding salt water to a desalination plant using compressed air, powered by geothermal energy, comprising the steps: feeding liquid into a geothermal well and drawing heated liquid from the well head of the geothermal well to form a primary liquid circuit, the primary liquid circuit passing through a desalination plant; communicating the heated liquid from the primary liquid circuit to a turbine to produce a mechanical output; and connecting the mechanical output to an air compressor to produce a first and a second compressed air supply, wherein the first compressed air supply is configured to drive a supply pump located within a salt water bore driving compressed air into the salt water bore below ground level, to drive salt water from the salt water bore to the desalination plant, and the second compressed air supply driving a start-up pump to initiate the primary liquid circuit.

In some embodiments, a third compressed air supply may be produced from the air compressor, the third compressed air supply configured to drive an air pump to pump salt brine away from the desalination plant.

In some embodiments, driving the turbine may be directly off the heated liquid of the primary liquid circuit. In some embodiments, driving the turbine may be off a secondary circuit in which heat from the heated liquid of the primary liquid circuit provides heat to a working medium of a secondary circuit to drive the turbine.

Effecting heat transfer between the primary and the secondary circuits of some embodiments may be via a heat exchanger.

In some embodiments, drawing ambient air through the air compressor may be via an air vacuum pump.

In some embodiments, drawing air from at least one chamber of the desalination plant may create a vacuum therein via a vacuum line off the vacuum pump.

In some embodiments, the turbine may be substituted for one of a screw expander, a steam engine, and an ORC turbine. In some embodiments, the turbine may comprise a series of turbines. In some embodiments, the air compressor may be a screw compressor or a piston compressor.

In some embodiments the method additionally provides a third compressed air supply configured to drive a brine pump to deliver salt brine away from the desalination plant.

The saltwater bore can further be substituted for the ocean or a salt water da, to provide a source of salt water to be delivered to the desalination plant.

Various features, aspects, and advantages of the disclosure will become more apparent from the following description of embodiments of the disclosure, along with the accompanying drawings in which like numerals represent like components.

BRIEF DESCRIPTION OF THE DRAWINGS

Embodiments of the disclosure are illustrated by way of example, and not by way of limitation, with reference to the accompanying drawings, of which.

Embodiments will now be described more fully hereinafter with reference to the accompanying drawings, in which various embodiments, although not the only possible embodiments, of the disclosure are shown. The disclosure may be embodied in many different forms and should not be construed as being limited to the embodiments described below.

DETAILED DESCRIPTION

Whist the geothermal desalination plant of the disclosure is described herein in relation to an MED desalination plant, it is contemplated that the disclosure can also be applied to a Reverse Osmosis (RO) desalination plant.

While the term "turbine" is used herein to describe a machine that produces mechanical work by passing a fluid flow over a rotor or impeller to impart rotational motion thereto, it is understood that the "turbine" can be substituted for other mechanical devices, such as a steam engine, an Organic Rankine Cycle (ORC) turbine or a screw expander. Those skilled in the art will appreciate that different expanders are suitable for different power ranges and applications.

The term "liquid" has been used herein to refer to the liquid of the primary liquid circuit. A secondary circuit is described to have a "working medium" where this medium is a fluid that circulates in a closed loop and is purely used as a working medium to transfer heat energy. It is understood that the liquid and the working medium could, in some embodiments, both be water. The working medium can be a liquid or gas with higher or lower boiling points and with different heat transfer properties such as N-Pentane.

The term "well" has been used herein to refer to a deep geothermal wellbore providing thermal energy from hot geology to power the system. For clarity, the term "bore" has been used herein to refer to a salt water wellbore, providing salt water to the desalination plant. The technical terms bore and well can be used interchangeably, and have been used selectively herein in relation to the geothermal well and the salt water bore, merely for clarity.

Figure 1:
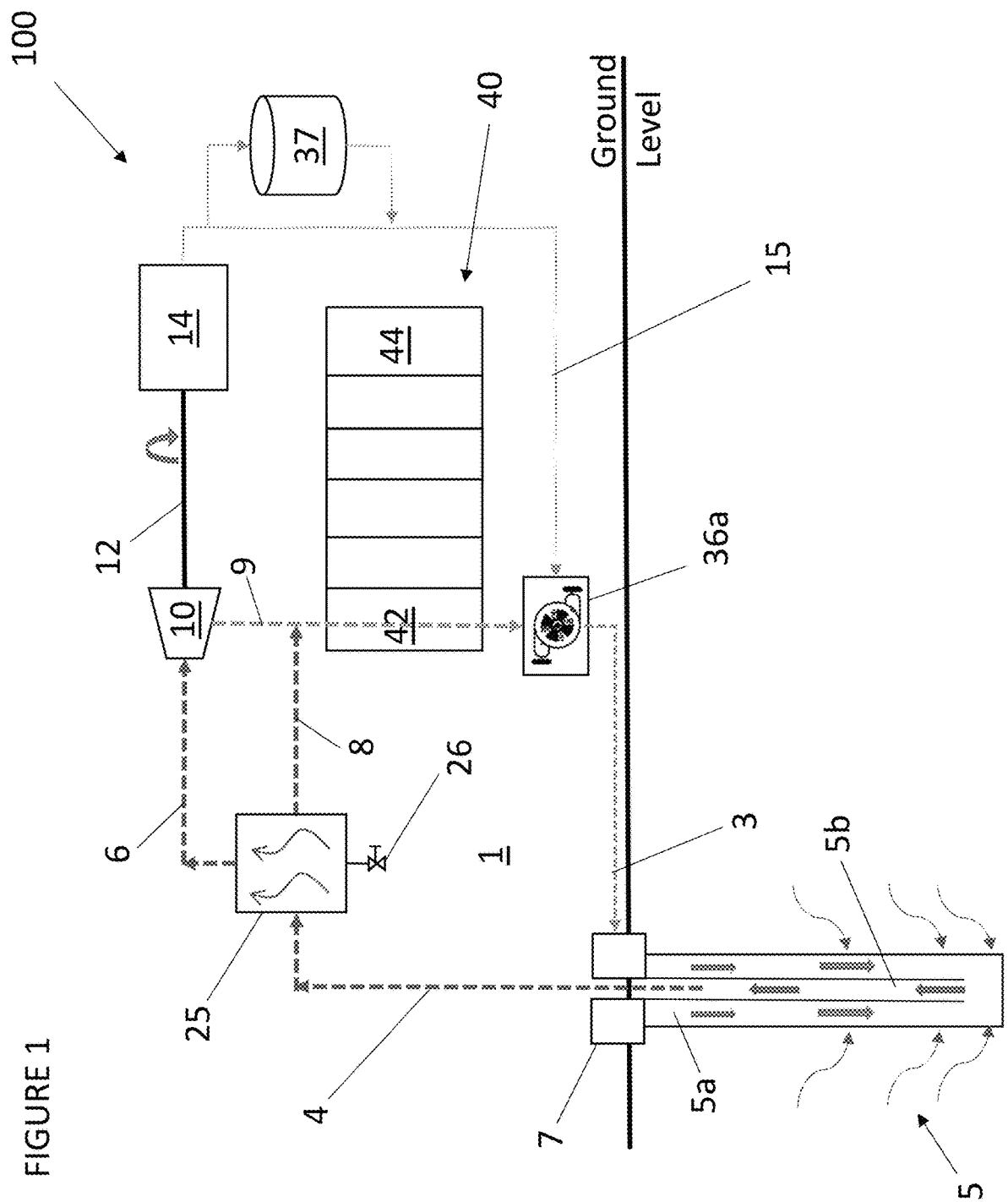
FIG. 1 is a schematic view of a geothermal desalination system, where a turbine is driven directly off heated liquid from a geothermal well.

With reference to FIG. 1, there is illustrated a schematic view of a geothermal desalination system (100), comprising; a primary liquid circuit (1) circulating a liquid (3) into a geothermal well (5) and returning heated liquid (4) from a well head (7) of the geothermal well (5), the primary liquid circuit (1) passing through a desalination plant (40); a first turbine (10) driven by the heated liquid to produce a mechanical output (12); and an air compressor (14) driven from the mechanical output (12) to provide a first compressed air supply (13) and a second compressed air supply (15), wherein the first compressed air supply (13) drives a supply pump (29) to supply salt water (16) to the desalination plant (40), and the second compressed air supply (15) drives a start-up pump (36a) to initiate the primary liquid circuit (1).

A geothermal well (5) with bottom-hole geology temperatures of about 300° C. is used to heat the primary liquid (3), for example water. The thermal syphoning effect forces geothermally heated water (4) to the surface as cold water (3) is drawn into the well (5) to heat. The hot water (4) from the well (5) is used to drive the turbine (10), which in turn drives the air compressor (14). The air compressor (14) sucks in ambient air (28) on a first side to create a vacuum for the chambers of the desalination plant (40).

The second side of the air compressor (14) outputs compressed air to at least the first supply line (13) and the second supply line (15) directly (or via a storage tank (37)). In some embodiments, a third supply line (31) and a fourth supply line (32), can be supplied from the air compressor (14) to drive ancillary pumps (described in further detail in reference to FIGS. 4 and 5).

The compressed air of the first supply line (13) drives the supply pump (29) (illustrated in Figure as an air-well pump) that pumps air into a sea or salt water bore (18) to drive salt water from the salt water bore (at about 20 nm to 50 m depth), which is then fed to the desalination plant (40) which provides a fresh water outlet (20) and a brine outlet (21) as two separate outputs. The primary liquid circuit (1) further comprises start-up pump (36a) or similar initiation system to kick-start the primary circuit (1) of the system (100), but once the thermal syphoning process begins there is little to no further requirement for pumping (e.g., zero to negligible energy input to keep the system running).

In FIG. 1 the primary liquid circuit (1) is illustrated as a dashed-line, that circulates the primary liquid (3), for example water, as it is drawn into the geothermal well (5) to be heated by the hot geology deep within the well (5). The depths of the well (5) can be between 3000 m to 10,000 m depending on the geology and the thermal energy required.

Figure 2:
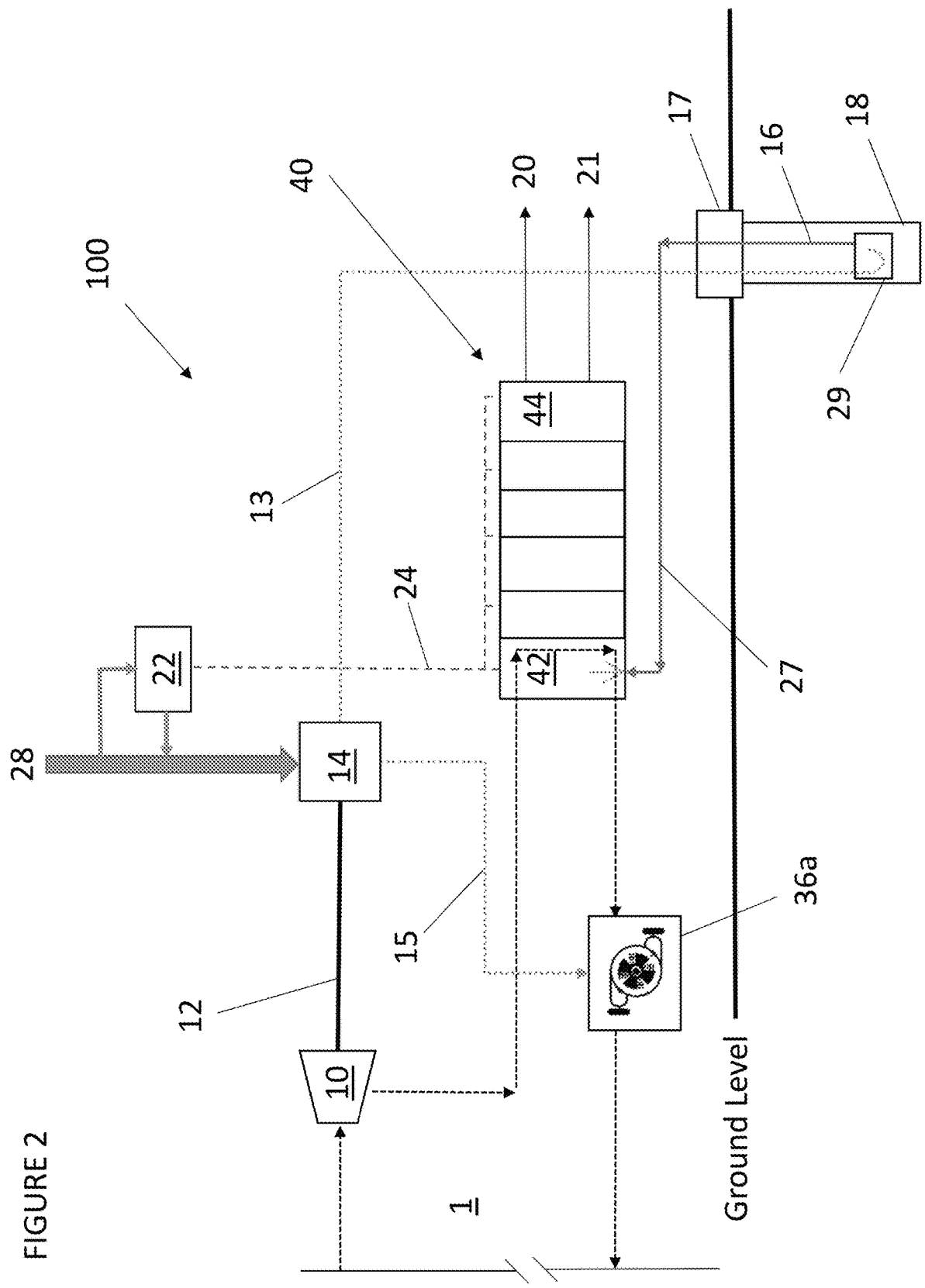
FIG. 2 is a schematic view of the geothermal desalination system of FIG. 1, illustrating a compressed air circuit driven by geothermal energy from the well.

In FIGS. 1 and 2, the primary circuit (1) is shown in dashed line, and the compressed air lines (13,15) are shown as dotted lines. A solid black line is shown between the turbine (10) and the air compressor (14) representing a shaft or axle that transmits the mechanical output (12) e.g. rotational movement, between the two.

The storage tank (37) can also be included in at least one of the compressed air supply lines (13,15,31,32) to store compressed air for initiation of the system (100).

As the primary liquid (3) is drawn into an inlet channel (5a) of the geothermal well (5) it is heated (the heat shown in FIG. 1 as arrows directed toward the well (5)) and the heated liquid (4) rises up through a centrally located, insulated return casing (5b) bringing the heated liquid (4) to ground level at the well head (7).

The heated liquid (4) is between 150° C. and 300° C. depending on the location of the well (5), the depth of the well (5) and the geology of the area.

Once the primary liquid circuit (1) is initiated, the action of the heated liquid (4) rising continues to draw cooler liquid (3) at about 50° C.-60° C. into the well (5) thus propagating the thermal syphoning effect.

Figure 3B:
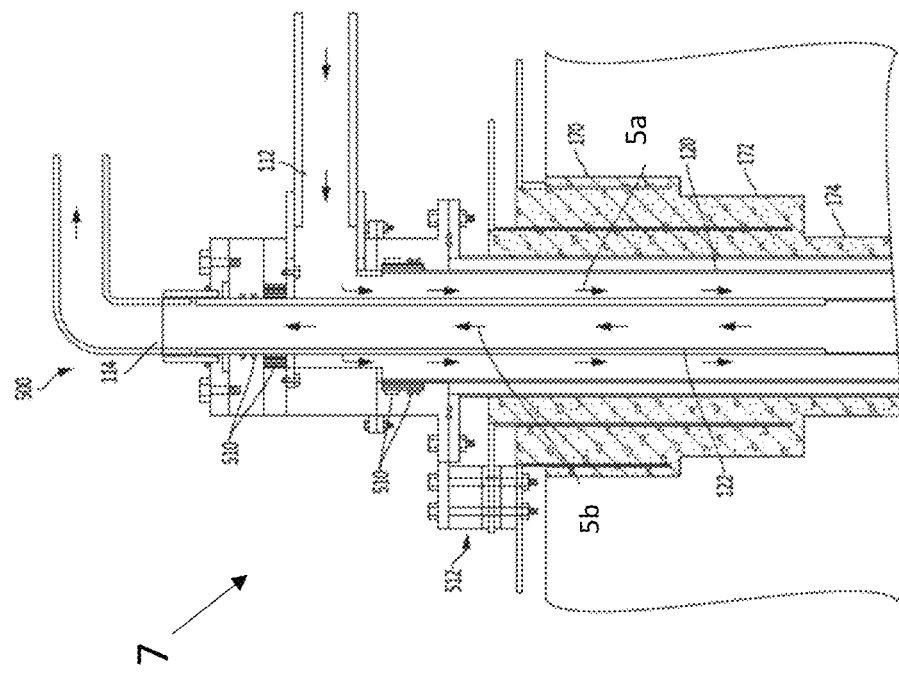
FIG. 3B is a cross-sectional view of a well head of the geothermal well, illustrating a series of valves and seals for controlling the flow of liquid into and out of the geothermal well within the primary liquid circuit.
Figure 3A:
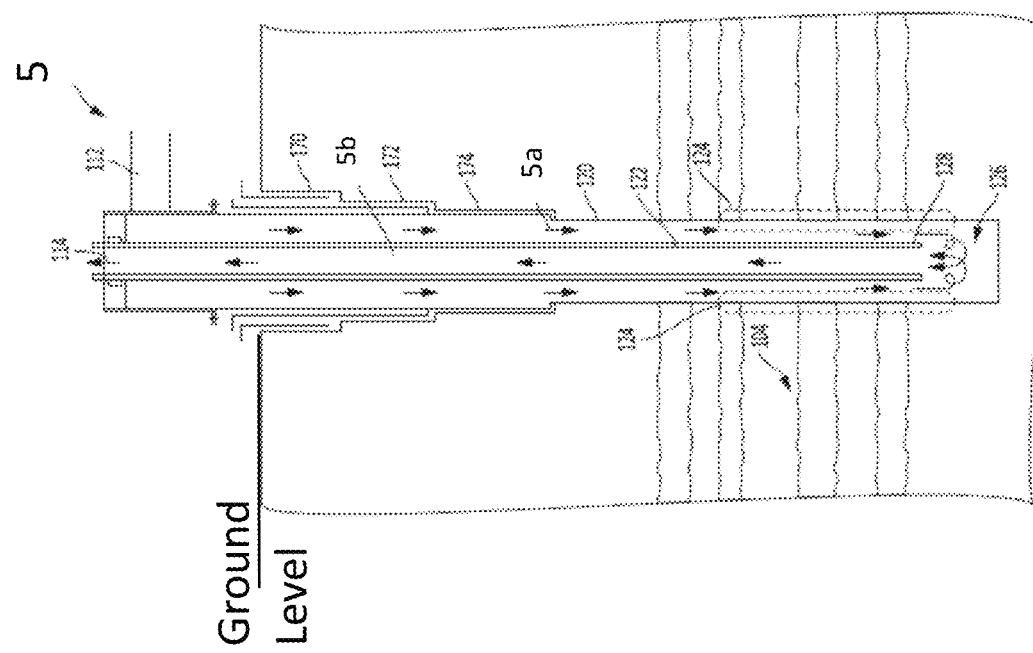
FIG. 3A is a cross-sectional view of a geothermal well, illustrating a steady reduction in a diameter of the well bore, as the well extends into the substrate.

Further details of the geothermal well (5) are described in relation to FIGS. 3A and 3B herein.

The heated liquid (4) is drawn into a flash separator or separator (25) where the pressure drops. This drop in pressure forces a portion of the heated liquid (4) to vaporize, and where the primary liquid (3) is water, to create steam (6). The steam (6) is communicated to the turbine (10) where the flow of steam (6) drives the turbine (10) or engine to produce the mechanical output (12) schematically illustrated in FIG. 1 as a shaft that is rotated or driven in a piston action. The mechanical output (12) as movement of the shaft is then transmitted to the air compressor (14). In this manner, at least a portion of the thermal energy drawn from the geology of the well (5) is used to drive the compressor (14) connected to the turbine (10).

As the vapour or steam (6) exits the turbine (10) the temperature of the primary liquid has reduced. Downstream of the turbine (10) the liquid/vapour exiting the turbine, exhaust (9), is mixed back into the primary liquid circuit (1) with the residual heated liquid (8) from the separator (25). These two streams (8, 9) of the primary liquid circuit (1) once combined are communicated to a first chamber (42) of the desalination plant (40) before being directed back to the geothermal well (5) to be reheated.

The primary liquid circuit (1) is a closed loop (at least outside of the well (5)). The liquid (4) is cooled, as it travels through the desalination plant (40), as thermal energy is drawn from the liquid (4) to vaporize the sea or salt water (16) in each chamber of the desalination plant (40). The sea or salt water (16) can be sprayed into each chamber of the plant (40) to be desalinated in stages therein. The primary liquid (4) is cooled within the desalination plant (40) and exits the first chamber (42) at a temperature between 50° C.-60° C. before being circulated back into the well (5).

As the liquid in the primary liquid circuit (1) emerges from the well head (7) at between 150° C.-300° C., the flash separator (25) can be used to provide a vapour (for example steam) to drive the turbine (10). In some circumstances, the heated liquid (4) can remain pressurised (not boiling) and can drive a device to convert thermal energy into movement.

Several stages of flash separator(s) (25) (also referred to as flash tanks) can be configured to provide for additional energy to be harvested. In some arrangements a series of flash separators are interlinked with the products of each separator driving a single turbine (10), alternatively the product of each separator can be individually channeled to drive a series of turbines/expanders.

The heated liquid (4) is fed from the well head (7) to the separator (25) where the heated liquid (4) enters the separator (25) typically via a throttling valve reducing the pressure of the liquid (4) to initiate flash evaporation. A portion of the heated liquid (4) immediately "flashes" into vapour, or steam where water is the selected liquid. The vapour is then drawn off the top of the separator (25) to drive the turbine (10). After flashing, the remaining heated liquid (4) of the primary liquid circuit (1) exits the separator (25) via an outlet or drain (26). This residual heated liquid (8) from the separator (25) is then mixed with the exhaust (9) of the turbine (10) before being directed to the desalination plant (40). On exiting the desalination plant (40), the liquid of the primary liquid circuit (1) is routed through the start-up pump (36a) at a reduced temperature of between 50° C.-60° C. before being directed back to the well (5) to continue the thermal syphoning effect.

The start-up pump (36a) is only used to initiate the primary liquid circuit (1) and is not required after start-up. The start-up pump (36a) is a fluid air pump and is driven by the second compressed air supply line (15) from the compressor (14). The start-up pump (36a) being driven off the second compressed air supply line (15) avoids the requirement for additional electricity to run the system (100). This part of the system will be further described in reference to FIG. 2.

When the well (5) has been sitting without flow or thermal energy production and the temperature of the liquid inside of the insulated return channel (5b) is the same temperature as the liquid outside of the insulated return channel (5b) in the inlet channel (5a) of the well (5) (outlet and inlet closed), the total volume of liquid (4) (eg. water) in the well (5) is heated according to thermal gradients of the geology. This means that the total in-well liquid temperature will be around 130° C. at 3000 m, 190° C. at 4000 m, 300° C. at 6000 m, 410° C. at 8000 m and 550° C. at 10000 m.

To start the thermal syphoning effect in the well (5), a small amount of water movement is required and this will take a small 10 KW start-up pump (36a) to initiate this flow, or a store of ambient temperature water held in an elevated storage tank that can be delivered into an annulus of the well head (7) by gravity and water head pressure which would avoid the requirement for additional energy. As soon as a volume of cooler liquid (3) is added into the well head (7), the weight of the newly added liquid will be heavier than the weight of the hotter liquid (4) inside of the well (5) and a flow from the well head (7) will increase as the cooler liquid (3) continues to be added and drawn into the annulus of the well (5). Within a few minutes, the start-up pump (36a) can be turned off as the thermal syphoning effect will generate the flow and thermal energy production.

Depending on the mechanical output (12) required the skilled person can selectively substitute the above described turbine (10) for alternative machines, for example: a direct stream turbine, an ORC turbine, a screw expander, a steam engine or the like.

The compressor (14) can be selected from either screw compressors or piston compressors, where a screw compressor will be better suited to a large volume of fluid under lower pressure and a piston compressor will be better suited to a larger pressure with less volume. Before moving to FIG. 2, a brief overview of the internal workings of a typical desalination plant is provided.

Multi-Effect Distillation (MED) Plants

Figure 7:
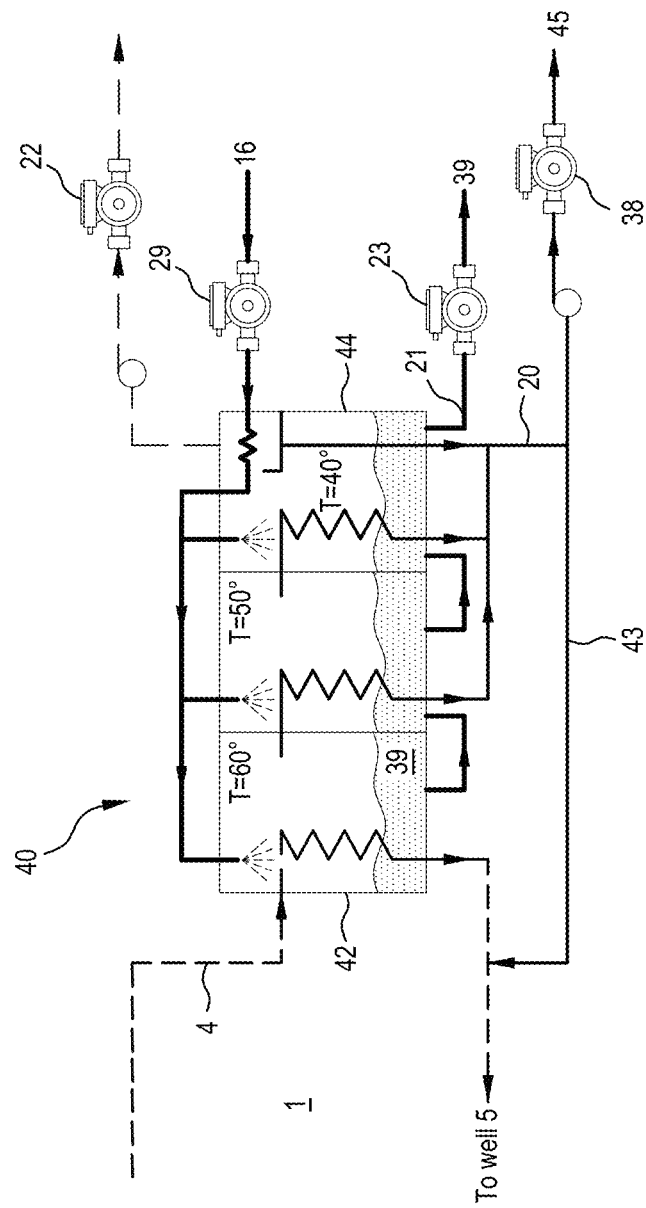
FIG. 7 is a schematic view of a multi-effect distillation (MED) desalination plant illustrating a series of three chambers each sequentially decreasing in temperature and pressure, to provide a first output of fresh water, and a second output of brine.

An MED plant uses distillation to desalinate sea or salt water. In each "effect" or "stage" of the multi effect distillation (MED) plant), salt water is sprayed onto tubes or plants heated by thermal energy inside of the tubes or plate heat exchangers that are position inside of the MED chambers. Some of the saline water evaporates, and this fresh vapour is directed into the next chamber of the MED plant to be sprayed onto the tubes or plates in the next chamber and so on until this process has been replicated between three and seven times in three to seven MED chambers of the MED plant with increasing vacuum or decreasing atmosphere pressure in each chamber, heating and evaporating more fresh water from salt water. Thus each stage reuses energy from the previous stage, with successively lower temperatures and pressures. A schematic diagram of an MED desalination plant (40) is illustrated in FIG. 7.

The MED plant (40) comprises a sequence of closed chambers separated by walls, having a hot fluid or steam heat source at a first chamber the same fluid with reduced heat (condensed) exiting from the first chamber. Each successive chamber has a temperature and a pressure lower than a previous chamber. This means the walls within each chamber are held at a temperature intermediate the temperatures of the fluids on either side thereof. This temperature differential, coupled with a pressure drop in the chamber, transfers evaporation energy from a warmer first zone of the chamber to a colder second zone of the chamber. From the second zone the heat energy then travels via conduction (and/or piping) through the wall to the colder subsequent chamber. Additional salt water can also be sprayed into the subsequent chambers to continue the effect through each chamber of the desalination plant (40).

The primary liquid circuit (1) of the system (100) is routed through the first chamber (42) of the MED plant (40) after being expelled from the turbine (10). In this manner the heat energy in the primary liquid circuit (1) is used to supply the MED plant (40) before being returned to the geothermal bore to be re-heated. The primary circuit liquid enters the first chamber of the MED plant (40) at about 80 to 95° C. On exiting the first chamber (42) having an ambient temperature of 60° C. to 70° C. cold salt or sea water is sprayed onto the heat exchanger that contains 80° C. to 95° C. steam or hot water at the entry point of the MED plant, the primary circuit fluid is thus reduced to about 70° C. to 50° C.

The temperature in the first chamber (42) of the desalination plant (40) is about 70° C., and drops by about 5° C. in each subsequent chamber. The temperature in a final chamber (44) is about 60° C. in a three chamber MED system illustrated in FIG. 7 or 45° C. in a six chamber MED system. The MED plant (40) can comprise additional chambers, depending on the quality of the salt water delivered to the MED plant and the required quality of fresh water (19) delivered from the MED plant (40).

The liquid in the primary liquid circuit (1) can be pumped by the start-up pump (36a) illustrated in FIG. 1 as an air pump, to the geothermal well head (7) inlet until such time as the thermal syphoning takes effect and naturally circulates the liquid of the primary liquid circuit (1). As such, the start-up pump (36a) is only required to initiate the primary liquid circuit (1).

Figure 6:
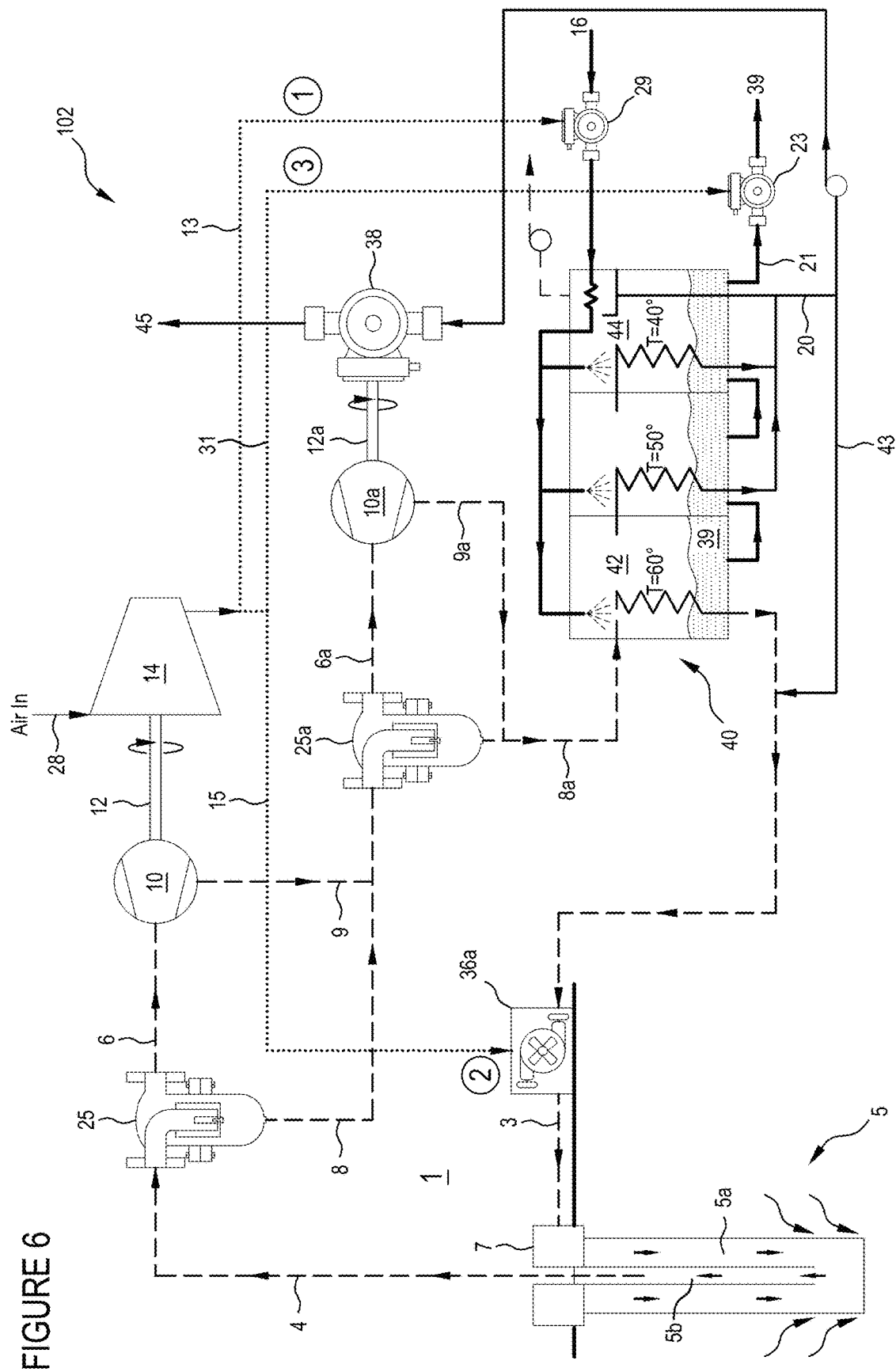
FIG. 6 is a schematic view of a geothermal desalination and pumping system, illustrating a plurality of turbines for providing discrete mechanical outputs for driving the desalination process and a pumping process simultaneously.

As illustrated in FIGS. 6 and 7, the desalination plant (40) has two main outlets: (i) fresh water outlet (20); and (ii) brine outlet (21). The brine outlet (21) directs brine (39) away from the plant (40) as the desalination plant (40) continues to process sea or salt water (16). The fresh-water outlet (20) directs fresh water (19) to a pipe line or a collection point (45) for use, or collection.

The fresh-water outlet (20) can also provide a supply of top-up water (43) that can be directed back into the primary liquid circuit (1) to account for water loss from the primary liquid circuit (1). This top up supply (43) of distilled water also serves as a cleaning system for the well circulation liquid.

In order to run the desalination plant (40) each subsequent chamber of the plant (40) requires a drop in pressure to continue the evaporation cycle of the desalination plant (40). As illustrated in FIG. 2, the air compressor (14) provides compressed air to the first, and second air supply lines (13,15) and creates the required vacuum for the chambers of the desalination plant (40).

Turning now to FIG. 2, the compressed air circuit of the system (100) is described in more detail.

Ambient air (28) is drawn into the system (100) through an air vacuum pump (22). This air vacuum pump (22) is impeller driven by fluid flow or a Venturi system creating suction in a vacuum line (24). The compressor (14) driven by the turbine (10) sucks ambient air (28) into the system and compresses the air into the supply lines (13, 15). The suction from the compressor (14) draws in the ambient air (28) driving the air vacuum pump (22) as it does so. The compressor provides at least two supply lines (13, 15) but can supply more as described herein in reference to FIGS. 4 and 5.

The first compressed air line (13) is directed to the supply pump (29) located deep within the salt water bore (18) or in the ocean or salt or sea water storage tank or dam. As air is pumped into the bottom of the salt water bore (18) or the ocean or storage tank or dam, the sea salt water is pumped to the surface and towards the MED plant (40). The supply pump or pumps (29) is/are capable of pumping this sea or salt water (16) along a salt water delivery line (27) for distances of up to 10 kms from the ocean, storage or bore (18) to the MED plant (40). At the termination of the delivery line (27) the sea or salt water (16) is sprayed at between sea or salt water temperature and ambient temperature into the chambers of the desalination plant (40).

It is calculated that for every million litres of salt water delivered to the MED plant (40) approximately 400,000 litres of distilled or fresh water (19) can be drawn from fresh-water output (20) without any $CO_2$ emissions, toxic waste or additional electricity load input and at an operational cost per KL of around 8 times lower than typical RO desalination costs per KL.

Although not illustrated in the Figures, the salt water bore (18) and the supply pump (29) can comprise a plurality of salt water bores (18) and air pumps, all feeding the delivery line (27) to feed one or more desalination plants (40).

The brine outlet (21) discharges the accumulated brine as a residual or waste product of the desalination system (100). However, this waste brine can be used for downstream processes, or harvested for desirable commercial properties.

The waste brine can be evaporated to produce salt, pot ash, magnesium, lithium and other minerals at very low cost compared to current mining process for these minerals. These products can be sold to farmers for fertilizing requirements and to the public for consumption and a wide range of other requirements. In some locations, local crops such as wheat and barley can be used to produce PLA at low cost. Using some of the waste heat from this geothermal MED system, PLA can be produced from locally grown crops at very low cost. This product can be exported and can generate environmentally friendly, plant based plastic production business opportunities.

Meanwhile, the suction of the air compressor (14) draws air from the chambers of the MED plant (40) to create a vacuum such that the compressed air on the pressure side of the compressor (14) delivers compressed air via the first supply line (13) to the salt water bore (18) or ocean to push the salt water to a bore head (17) or to the surface and into the MED plant (40).

As ambient air (28) is continually drawn through the air vacuum pump (22) by the compressor (14) the vacuum is continually created on the other side of the vacuum air pump (22). This vacuum is communicated to the chambers of the plant (40) via the vacuum line (24) that draws air from each of the chambers of the MED plant (40) to drop the pressure therein, as required to propagate the continued distillation in each subsequent chamber of the desalination plant (40).

The second compressed air line (15) is directed to the start-up pump (36a) and the first compressed air line (13) is directed to the supply pump (29) as described above.

Air Well Pumps

The supply pump (29) is an air-well pump driven entirely from the first compressed air supply (13) from the compressor (14) powered by geothermal energy from the well (5). The supply pump (29) requires no additional energy or electrical input.

Air-well pumps are highly efficient and have low maintenance requirements because there are no moving parts. The air-well pump is located deep within a salt bore (18) and fed with air from the first air supply line (13). The air is released within the bore (18) which then pushes the salt water (16) from the bottom of the bore (18) (which could be an ocean bore or an inland bore) and pushes the salt water to a desired location, for example a tank, reservoir or desalination plant (40).

In this design, the compressed air supply (13) delivers the salt ground-water from a larger salt ground-water system that is commonly found inland in Australia, and particularly in wheat belt and arid areas.

The mechanical output (12) from the turbine (10) can be used to drive a raft of mechanical devices, for example, a pump, a compressor, a further turbine, or a generator. However, it is more efficient to drive a compressor because both the suction side and the pressure side of the compressor (14) can be used to supply the vacuum needs of the desalination plant (40) and salt water (16) delivery. If the mechanical output (12) was used to drive an electric generator to run a vacuum pump and to run electric submersible pumps for salt water delivery, then there would be energy losses in the conversion to electricity and then further loses in the conversion back to mechanical motors to generate the vacuum and move the salt water. This would in turn drive higher costs for maintenance and replacement of electrical components.

As such, the use of the supply pump (29) provides an ideal pairing, as the MED plant (40) requires a vacuum for the salt water (16) to boil at less than 100° C. in its chambers.

Each section of the MED plant (40) has a higher vacuum (lower pressure) as the salt water (16) is cooled in every stage of the MED plant (40). The final chamber (44) of six chamber MED plant (40) will have a temperature of around 45° C. and this requires the largest vacuum for the salt water to vaporize, greater than the first chamber (42) where the chamber temperature is ideally 70° C.

The incorporation of the air storage tank (37) also facilitates the use of several down-hole air pumps and several vacuum pumps. In addition, the air storage tank (37) provides an energy storage so that when the geothermal well (5) is turned down or off for short periods, the compressed air supply lines (13,15) can be activated to drive at least one of: the air vacuum pump (22); the start-up pump (36a); and the down-hole supply pump (29).

It is calculated that the system (100) will required a significantly shallower and lower cost geothermal well (5) than a system for running a generator for generating electricity. The system (100) will require the liquid in the primary circuit (1) to reach about 150° C. when delivered from the geothermal well (5) to run the turbine (10) and the MED plant (40).

The system (100) can be installed inland to utilise the large supplies of salt water or on the coast to use sea water as a source for desalination. The cost of producing fresh water in all of these locations, including maintenance, equipment depreciation, wages and admin costs is calculated to be about AUD$0.30c per KL. Compared to RO desalination that costs about A$2.20 per KL for a lower quality water product and produces large amounts of $CO_2$ and plastic waste; geothermal desalination by MED is much cheaper and produces no waste plastic or $CO_2$ emissions. The well(s) (5) will produce thermal energy for hundreds of years and the low cost surface equipment will require minimal maintenance, and routine replacement about every thirty years.

Geothermal Well

The geothermal well (5) and well head (7) are further described in relation to FIGS. 3A and 3B, which are excerpts from Australian Patent No. AU 2020101487. Although FIGS. 3A and 3B illustrate only one well (5) it is understood that multiple wells can be used in series or in parallel to increase the potential mechanical output (12) of the pumping station (100).

A single well (5) is illustrated in FIG. 3A to provide a means for circulating liquid through a reservoir and also provide an inlet channel (annulus) (5a) and insulated return channel (5b) for supplying a primary liquid to the well head (7). The channels (5a, 5b) are arranged co-axially in tubing strings within the well (5).

Shown in FIG. 3A, the well (5) includes a pipe inlet (112), a pipe outlet (114), the inlet channel (5a) (first channel) and the insulated return channel (5b) (second channel) disposed concentrically therein. Although not illustrated, it is contemplated that the inlet channel (5a) could be swapped with the insulated return channel (5b) such that the inlet channel (5a) is bounded and centrally located within the return channel (5b).

The inlet channel (5a) extends down the well (5) and receives liquid from the pipe inlet (112) and is defined between an outer casing (120) and an insulated inner casing (122). The insulated return channel (5b) is defined by the insulated inner casing (122) positioned within the outer casing (120). The insulated return channel (5b) provides heated liquid (4) to the pipe outlet (114).

Additional support casings can be nested to extend the well downwards with a decreasing diameter. For example, a first support casing (170) extends from the well head (7) and geological surface inward towards the well end (e.g., into the ground). In some embodiments, the first support casing (170) extends axially into the ground to a depth of approximately 100 metres. The first support casing (170) may have a diameter of 30 inches. A second support casing (172) is positioned within, and may abut, the first support casing (170) and extends from the well head and geological surface inward towards the well end (e.g. into the ground) at a depth greater than the first support casing (170). In some embodiments, the second support casing (172) extends axially into the ground to a depth of approximately 1500 metres. The second support casing (172) may have a diameter of 18⅝ to 20 inches. A third support casing (174) can be positioned within, and may abut, the second support casing (172) and extends from the well head and geological surface inward towards the well end (e.g. into the ground) at a depth greater than the second support casing (172). In some embodiments, the third support casing (174) extends axially into the ground to a depth of approximately 3000 metres. The third support casing (174) may have a diameter of 13⅜ to 16 inches.

The outer casing (120) is positioned with the third support casing (174) and extends past the third support casing (174) and defines a bottom of the well (5). The outer casing (120) can be partially defined by the geological layers such that the liquid (4) is permeable through a portion (124) of the outer casing (120) in the permeable geological layer. In some embodiments, the permeable portion (124) of the outer casing II (120) is at a depth between 7500 metres and 9000 metres. The permeable portion (124) of the outer casing (120) may be configured to allow a liquid flow path (104) through the permeable rock toward a secondary well (not illustrated). The outer casing (120) may be consolidated rock such as granite that contains no groundwater, but has high levels of heat that will transfer into the cooler liquid (3) as the liquid is drawn down the inlet channel (5a) and comes into contact with the outer casing (120) of the well (5).

In some embodiments, the outer casing (120) extends axially into the ground to a depth of approximately 8,800 m-12,000 m and is not defined by geological layers, ie. the outer casing (120) extend to the bottom of the well (5). Where the outer casing (120) extends to and defines the bottom of the well (5) the well is closed to the surrounding geology. This "closed-well" or sealed well arrangement prevents contact between the liquid of the primary liquid circuit (1) and the geology surrounding the well (5). This "closed well" arrangement prevents sediment and other geological impurities from entering the liquid (4) of the primary liquid circuit (1). The outer casing I (120) may have a diameter of 12 to 14.5 inches.

The insulated inner casing (122) is positioned within the outer casing (120) and is configured to receive the flow of the liquid (3) through the inlet channel (5a) at an end of the insulated inner casing (122). In some embodiments, the end of the inner casing (122) includes an intake screen (128) and/or intake filter that receives the heated fluid flow from the inlet channel (5a) as it enters the insulated return channel (5b). The intake screen (128) can be configured to provide a filter to the liquid (3) as it enters the insulated inner casing (122).

In one embodiment, the pipe inlet (112) of the first well 110 may receive a flow of between 5 and 20 kg/see (eg, mass flow rate) at a temperature of 50° C. that flows through the inlet channel (5a) towards the bottom of the pipe. The injection velocity through the inlet channel (5a) may be 0.02 to 0.72 m/sec. The liquid is heated as it passes through the lower layers of geology. The slower the liquid flow down the inlet channel (5a), the more thermal energy in the form of heat will be transferred from the geology into the primary liquid (3).

In some embodiments, liquid from the surrounding geology enters the inlet channel (5a) through the permeable portion (124) of the outer casing (120). The liquid enters and can expand within the gap (126) as it enters the intake screen (128) of the inner casing (122) and into the insulated return channel (5b). In most parts of Australia, the temperature of the liquid can be approximately 300° C. in a 6,000 metre deep well as the liquid (3) travels through the gap (126) toward the insulated return channel (5b). The heated liquid (4) can flow out of the pipe outlet (114) at a liquid flow rate of between 5 and 20 kg/see at a temperature between 150° C. to 280° C. from the insulated return channel (5b) depending on the depth of the geothermal well (5). The well (5) can have a thermal energy output of between 5 MW-30 MW, for example 19.78 MWth with a flow rate from the well head (7) of 20 Kg/see and temperature of 280° C. where the initial well injection temperature is 50° C.

An expanded view of the well head (7) is shown in FIG. 3B. The well head (7) includes a plurality of seals (510), an exterior support collar (512), and other features to provide proper support and outlet for of the well (5).

Thermal syphoning moves the liquid within the well (5) once the system begins flowing. In some embodiments, 50°

C. liquid (water cooled after generating a mechanical output) is drawn down the well (5) where the liquid (3) is heated up on its journey to the bottom of the well (5) and then pushed to the surface at the well head (7). The increased temperature and the pressure created from the heat forces the heated liquid up the production casing to the surface.

In some embodiments, an open well configuration may include the well (5) having a slotted portion at the bottom of the well in-line with the permeable geology such that the liquid can flow in and/or out of the well (5), through the geology, and downstream to a secondary well in series.

In one particular embodiment of the thermal syphoning system, the system may be a six well system, with injection flow rates being: Well 1-50 kg/s, Well 2-30 kg/s, Well 3-30 kg/s, Well 4-30 kg/s, Well 5-30 kg/s, Well 6-10 kg/s with the total injected being 180 kg/second. In this embodiment, the production flow rate may be: Well 1-30 kg/s, Well 2-30 kg/s, Well 4-30 kg/s, Well 5 30 kg/s and Well 6-30 kg/s. Total production of the embodiment may result in a flow rate of about 180 kg/second and 116 MW of thermal energy.

In one arrangements of the well (5) using a thermal syphoning system, a 300° C. or hotter bottom hole geology temperature, the natural flow rate (without restriction by an adjustable valve at the wellhead outlet) out of a 6.3" ID insulated production casing at the surface could be 30 kg/s or a velocity of 2 m/s. While the heated liquid (4) may experience heat loss on the journey up the well (5), the outlet temperature will typically be 5% less than the liquid temperature at the bottom of the well (5).

The well (5) can be configured for a few thousand metres up to about 12,000 m into almost any geology including granite. The geothermal heat is exchanged at depth via a closed-loop system rather than bringing deep geothermal brine to the surface. This form of well (5) has a production life of 100+ years, with relatively low maintenance costs. The well (5) has a small physical footprint and has minimal impact on surface ground water systems, as the layers of casings around the well (5) provide protection.

Figure 4:
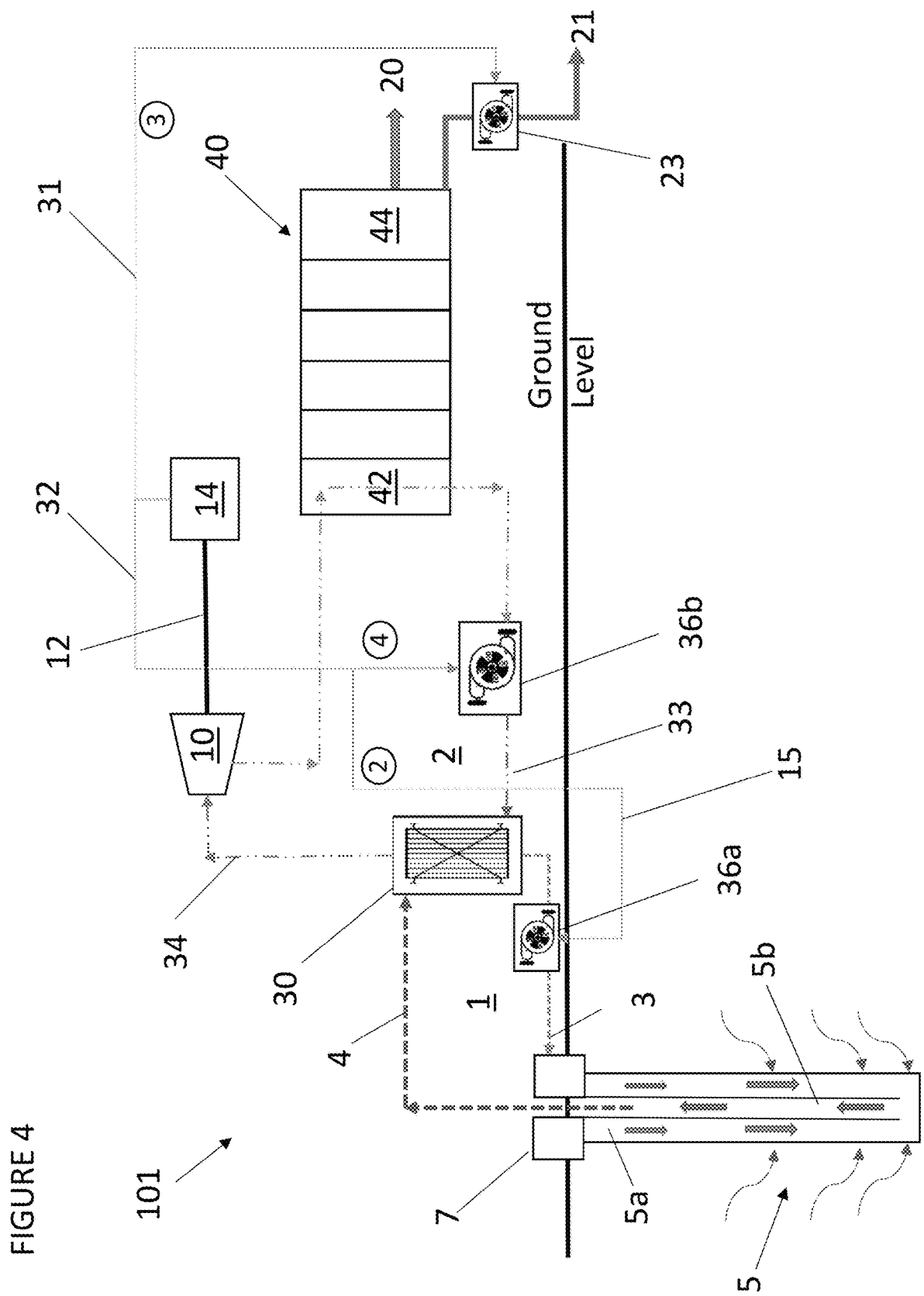
FIG. 4 is a schematic view of a geothermal desalination system using a secondary (or Organic Rankine Cycle 'ORC') circuit.
Figure 5:
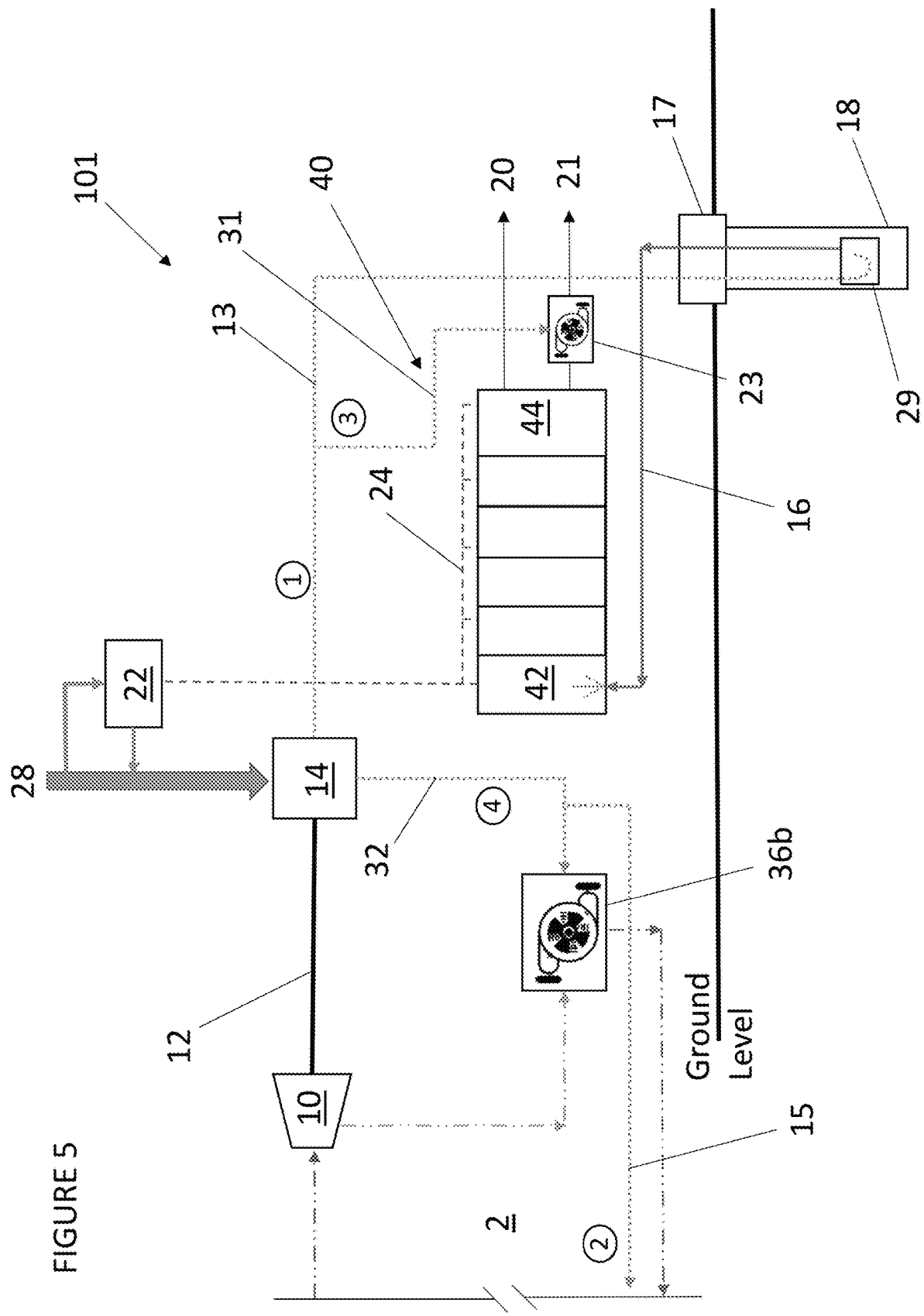
FIG. 5 is a schematic view of the geothermal desalination system of FIG. 4, illustrating a compressed air circuit driven by thermal energy from the geothermal well.

A second aspect of the disclosure is shown in FIGS. 4 and 5, which illustrate a geothermal desalination and salt water delivery system (101), comprising: a primary liquid circuit (1) circulating liquid (3) into a geothermal well (5) and returning heated liquid (4) from a well head (7) of the geothermal well (5); the heated liquid (4) being fed to a heat exchanger (30) to heat a working medium (33) of a secondary circuit (2) passing through a desalination plant (40), wherein the heated working medium (34) of the secondary circuit (2) drives a turbine (10) to produce a mechanical output (12); and an air compressor (14) driven from the mechanical output (12) to provide a first compressed air supply (13) and a second compressed air supply (15), wherein the first compressed air supply (13) drives a supply pump (29), and the second compressed air supply (15) drives a start-up pump (36a) to initiate the primary liquid circuit.

A second embodiment of a geothermal desalination system (101) requires no electricity and also uses the thermal syphoning effect for energy requirements to maintain the primary liquid circuit (1) and to deliver salt water (16) to the desalination plant (40).

With this zero electricity desalination system (101), it is possible to drive the compressor (14) from the heated or vaporised medium (34) of the ORC or secondary circuit (2) that is heated by the primary liquid circuit (1) with thermal energy derived from the geothermal well (5). The geothermal desalination and salt water delivery system (101) uses the compressor (14) to both create vacuum in the desalination plant (40) and to supply the first compressed air line (13) to power the supply pump (29) in the form of an air-well pump to push sea or salt water from the ocean or salt water bore (18) to the desalination plant (40).

The supply pump (29) is essentially a pipe that directs the compressed air supply line (13) into the salt water bore (18). The compressed air is released at the bottom of the bore (18) and this air then pushes salt water in the bore (18) to the bore head (17) at the surface. There are no moving parts to rust or decay within the supply pump (29) providing a very efficient, and low maintenance option. The air powering the supply pump (29) is sufficient to drive the salt water (16) to the surface at the bore head (17) and to drive the salt water (16) along several kilometres of salt water delivery pipeline (27) for ambient temperature delivery to the first chamber (42) of the desalination plant (40).

In FIGS. 4 and 5, the primary liquid circuit (1) is shown in dashed line, the secondary circuit (2) is shown in dot-dot-dashed line, and the compressed air lines (13,15) are shown as dotted lines. A solid black line is shown between the turbine (10) and the air compressor (14) representing a shaft or axle that transmits the mechanical output (12) e.g. rotational movement between the two.

An Organic Rankin Cycle (ORC) has been incorporated into the first aspect of the disclosure (100) to provide mechanical output (12) when the geological temperature is not hot enough for a direct steam or direct screw expander system. This mechanical output (12) is then fed to the compressor (14), as described above in relation to the first aspect of the disclosure. The compressor (14) is selected from rotary or piston style compressors depending on the required air compressor volumes.

The primary liquid circuit (1) operates in the same manner as described herein in relation to the first aspect of the disclosure; however, the turbine (10) is not driven off the primary liquid circuit (1). In contrast to the geothermal desalination system (100), the geothermal desalination and salt water delivery system (101) uses the heat exchanger (30) to transfer the geothermal heat from the primary liquid circuit (1) to the working medium (33) in a secondary circuit (2) that is separated from the primary liquid circuit (1) of the well (5). The secondary circuit (2) is a closed circuit.

The second side of the air compressor (14) outputs compressed air to at least the first supply line (13) and the second supply line (15) directly (or via the storage tank (37)). Illustrated in FIGS. 4 and 5, is further provided a third supply line (31) to driving a brine pump (23) and a fourth supply line (32) supplied from the air compressor (14) to drive a circuit pump (36b) illustrated in FIG. 4. The brine pump (23) is configured to draw the waste product of desalination from the MED plant (40) in the form of brine (39).

The secondary circuit (2) includes the circuit pump (36b), as illustrated in FIG. 4. The circuit pump (36b) drives circulation of the working medium (33) within the secondary circuit (2). The secondary circuit (2) (ORC system) uses a working medium that has a low boiling point such as N-Pentane. Similar to the start-up pump (36a) the circuit pump (36b) is driven by compressed air channeled from the compressor (14) to the circuit pump (36b) via the fourth compressed air supply line (32).

The compressed air of the first supply line (13) drives the supply pump (29) (illustrated in FIG. 5 as an air-well pump to pump compressed air into a sea or salt water bore (18) to drive salt water from the salt water bore (at about 20 nm to 50 m depth), which is then fed to the desalination plant (40) which provides a fresh-water outlet (20) and a brine outlet (21) as two separate outputs. The start-up pump (36a) or similar initiation system kick-starts the primary liquid circuit (1) of the system (100), but once the thermal syphoning process begins there is little to no further requirement for pumping (e.g. zero to negligible energy input to keep the system running).

The circuit pump (36b) keeps the working medium (33) flowing around the secondary circuit (2), to continually draw cool working medium (33) through the heat exchanger (30). Heat energy from the heated liquid in the primary liquid circuit (1) is transferred to the working medium (33) in the heat exchanger (30) before continuing around the secondary circuit (2) delivering the heated/vaporised working medium (34) to the turbine (10) to create the mechanical output (12).

Compressed air from the storage tank (37) can be channeled to the start-up pump (36a) and circuit pump (36b) when the system (101) is to be initialised. The pumps (36a,36b) initiate the circulation of the liquid of the primary liquid circuit (1) and fluid medium of the secondary circuit (2) simultaneously pushing the liquid (3) at ambient surface temperature into the geothermal well inlet channel (5a) with pump (36a) and drawing the ambient temperature working medium (33) from the desalination plant (40) and pumping it towards the heat exchanger (30) to heat. The pumps (36a,36b) are preferably air pumps driven off the second air supply line (15) and the fourth air supply line (32).

In some embodiments either or both of the start-up pump (36a) and circuit pump (36b) can be powered by electricity from an external source. However, driving the start-up pump (36a) and circuit pump (36b) from compressed air from the compressor (14) provides a more cost effective solution and avoids the need for external electricity supply to initiate both the primary liquid circuit (1) and the secondary circuit (2). It is further contemplated that the air-well pump (23) can also be configured to be powered from an external electricity supply or alternative power supply.

The storage tank (37) (not illustrated in FIGS. 4 and 5) can be incorporated into at least one or each of the compressed air supply lines (13,15, 31, 32) to store compressed air for initiation of the system. One possible arrangement for the storage tank (37) is shown in FIG. 1. In some embodiments, the single storage tank (37) can be incorporated into the system (100, 101) to selectively supply one or more of the air supply lines (13,15, 31, 32).

The secondary circuit (2) passes working medium (33) through the heat exchanger (30) to heat, which turns the working medium to a heated vapour (34). The heated vapour (34) is then fed to the expander or turbine (10) to generate the mechanical output (12) to drive the pump or compressor (14). No flash separator is required in the primary liquid circuit (1) as the heat exchanger (30) provides the additional heat energy to convert the working medium (33) to heated vapour (34) to drive the turbine (10).

The heated working medium (34) exits the turbine (10) at around 95° C. at which time it is directed to the first chamber (42) of the desalination plant (40). As the fluid of the secondary circuit (2) travels through the chamber (42) it loses heat and drops to temperatures of between 70° C. to 50° C. As the secondary circuit (2) exits the first chamber (42) of the plant (40) the temperature is reduced down to about 70° C. to 50° C. and the working medium is directed toward the circuit pump (36b). On exiting the pump (36b) the working medium (33) of the secondary circuit (2) is passed back to the heat exchanger (30) to be reheated before repeating circulation around the secondary circuit (2) as described.

Illustrated in FIG. 5, the air compressor (14) can supply four compressed air supply lines (13, 15, 31, 32) which operate as described above in relation to the geothermal desalination system (100) and FIGS. 1 and 2. In alternative embodiments of the disclosure, more than four air supply lines can be fed from the compressor (14) to drive additional machines/pumps.

Illustrated in FIG. 6, a third aspect the disclosure provides a geothermal desalination and pumping system (102), comprising; a primary liquid circuit (1) circulating liquid (3) into a geothermal well (5) and returning heated liquid (4) from a well head (7) of the geothermal well (5), the primary liquid circuit (1) passing through a desalination plant (40); a first turbine (10) driven by the heated liquid (4) to produce a first mechanical output (12) and a compressor (14) driven off the first mechanical output to provide a first compressed air supply (13) and a second compressed air supply (15), wherein the first compressed air supply (13) drives a supply pump (29) to supply salt water (16) to the desalination plant (40), and the second compressed air supply (15) drives a-start-up pump (36a) to initiate the primary liquid circuit (1); and a second turbine (10a) driven by the heated liquid (4) to produce a second mechanical output (12a), wherein the second mechanical output drives a fresh water pump (38), pumping fresh water from the desalination plant (40) to a delivery point (45).

Typically, the desalination plant (40) will take around 20° C. off the temperature of the heating or primary liquid circuit (1) as it passes through the first chamber (42) of the MED plant (40). The larger the capacity of the MED plant (40) the more heat required from the primary liquid circuit (1). Conversely, the smaller the capacity of the MED plant (40), the less heat required from the primary liquid circuit (1). Accordingly, there is sufficient thermal energy in the heated liquid (4) heated by the geothermal well (5), to power the desalination plant (40), while simultaneously drawing off thermal energy and converting it to mechanical energy to drive a series of pumps (23, 29, 36a, 38) and compressors (14) of the system (102).

A plurality of compressed air lines from the compressor (14) illustrated in FIG. 6, can be configured to drive the start-up pump (36a), the supply pump (29), and the brine pump (23) to remove brine from the plant (40).

The fresh water pump (38) drawing the fresh, desalinated, water (19) from the fresh-water outlet (20) of the desalination plant (40) and pumping it to the delivery point (45) can be driven: (i) directly by the second mechanical output (12a) of the second turbine (10a) as shown in FIG. 6; (ii) by electricity generated by the turbine (10) and transmitted via mechanical output (12); or (iii) by compressed air generated by the compressor (14) driven by the turbine (10) and the mechanical output (12), not illustrated in FIG. 6. The mechanical output (12) can be transmitted via a drive shaft.

The delivery point (45) for the fresh water (19) can be a dam, a reservoir, a pumping station, a pipeline, a plant, a vessel, a tank or the like.

In order to provide power for the additional components of the desalination and pumping plant (102) without the requirement for additional electricity, the heated liquid (4) (which can be water) is channeled through the first flash separator (25) where the pressure is reduced in the separator (25) to instantly flash evaporate a portion of the vapour into steam (6), about 10%.

The steam (6) is then drawn off the top of the separator (25) to drive the first turbine (10). The turbine (10) is directly linked to the compressor (14) which is driven from the mechanical output (12) of the turbine (10). The compressor (14) then feeds the plurality of compressed air supply lines: first supply line (13) to drive the supply pump (29) as described herein; second supply line (15) to drive the start-up pump (36a) to initiate the primary liquid circuit (1) when/if required; third supply line (31) to drive the brine pump (23) which pumps brine (bi-products of the desalination process) from the brine outlet (21) out of the desalination plant (40); and fourth supply line (32) to drive the circuit pump (36b) to initiate circulation in the secondary circuit (2).

Supply pump (29) is illustrated in proximity to the desalination plant (40) in the schematic view of FIG. 6; however, as described herein the supply pump (29) is physically located deep within the salt water bore (18) and can be distanced from the desalination plant (40) by some 10 kms or more.

After exiting (exhausting from) the turbine (10) the still hot exhaust (9) in the form of vapour (6) and/or heated liquid (4) is reintroduced and mixed back into the primary liquid circuit (1).

After flashing, the un-flashed liquid of the primary liquid circuit (1) exits the separator (25) via the drain (26). This un-flashed residual heated liquid (8) is mixed with the exhaust (9) of the turbine (10) before being directed to a secondary flash separator (25a). Again the exhaust (9) and the residual heated liquid (8) fed to the secondary separator (25a) is reduced in pressure on entry to the separator (25a) causing about 10% of the liquid to immediately evaporate into vapour or steam (6a). The vapour (6a) is channeled to the secondary turbine (10a) which generates the secondary mechanical output (12a) to drive the freshwater pump (38).

The exhaust (9a) of the secondary turbine (10a) is reintroduced to the primary liquid circuit (1) and mixed with the residual heated liquid (8a) from the secondary separator (25a) before being fed to the desalination plant (40) at a temperature of about 95° C. Specifically, the primary liquid circuit (1) after passing through each of the separators (25, 25a) and each of the turbines (10, 10a) is fed to the first chamber (42) of the desalination plant (40) to evaporate the salt water (16) introduced thereto.

The freshwater pump (38) can be replaced with a compressor, but for large volumes of fresh water (19) a mechanical pump is preferred. The freshwater pump (38) will draw the fresh water from the fresh-water outlet (20) of the desalination plant (40) and pump the fresh water to the predetermined delivery point (45).

Depending on the mechanical output required the skilled person can selectively substitute the above described turbines (10, 10a) for alternative machines, for example: direct stream turbines, ORC turbines, screw expanders, steam engines or the like.

Additionally, the compressor (14) can be selected from either screw compressors or piston compressors, where a screw compressor will be better suited to a large volume of fluid under lower pressure and a piston compressor will be better suited to larger pressures with less volume.

The geothermal desalination and pumping system (102) may require a deeper geothermal well (5) depending on the geology of the area, to provide the additional thermal energy required to feed both turbines (10, 10a), before being introduced to the plant (40) at a sufficient temperature.

The ambient air (28) is drawn into the compressor (14) configured as described above in relation to the systems (100) and (101) in order to supply the vacuum line (24) to the chambers of the desalination plant (40) via the air vacuum pump (22) (not illustrated in FIG. 6).

In a fourth aspect the disclosure provides a method of feeding salt water to a desalination plant (40) using compressed air, powered by geothermal energy, comprising the steps: feeding a primary liquid (3) into a geothermal well and drawing heated liquid (4) from the well head (7) of the geothermal well (5) to form a primary liquid circuit (1), the primary liquid circuit (1) passing through a desalination plant (40) (step 400); communicating the heated liquid (4) from the primary liquid circuit (1) to a turbine (10) to produce a mechanical output (12) (step 401); and connecting the mechanical output (12) to an air compressor (14) to produce a first compressed air supply (13) and a second compressed air supply (15) (step 402), wherein the first compressed air supply (13) is configured to drive a supply pump (29) located within a salt bore (18) driving compressed air into the salt bore (18) below ground level, to drive salt water (16) from the salt bore (18) to the desalination plant (40) (step 403), and the second compressed air supply (15) drives a start-up pump (36a) to initiate the primary liquid circuit (1) (step 404).

Figure 8:
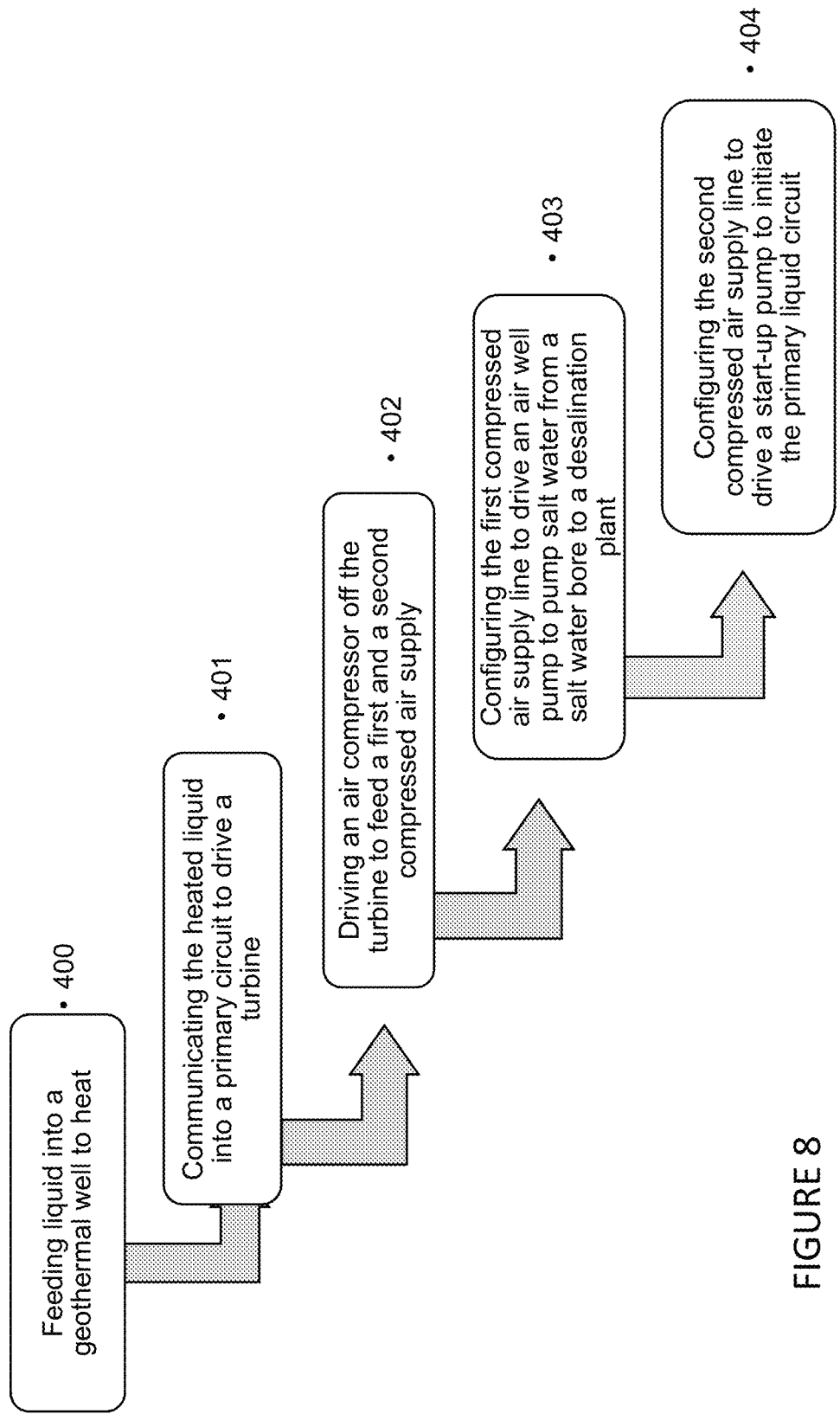
FIG. 8 is a diagrammatic view of a method of feeding salt water to a desalination plant using compressed air, powered by geothermal energy.

The method of feeding salt water to a desalination plant using compressed air, powered by geothermal energy is described further in relation to FIG. 8.

In some embodiments step 401 delivering heated liquid to the turbine (10) is driven directly off the primary liquid circuit (1). Alternatively, the primary or single liquid circuit (1) can be configured to communicate the heat energy to a secondary circuit (2) via the heat exchanger (30), where the turbine (10) is then driven off the secondary circuit (2).

In some embodiments the method further comprises a step of pumping the primary liquid (3) around the primary liquid circuit (1) to initiate the primary liquid circuit (1).

In some embodiments the method further comprises a step of pumping a working medium (33) around the secondary circuit (2) to draw cool working medium (33) from the desalination plant (40) before being communicated back to the heat exchanger (30) to be heated.

In some embodiments the secondary turbine (10a) is configured to be driven off the heated liquid (4, 34) of either of the primary liquid circuit (1) or secondary circuit (2) to produce the first mechanical output (12) and the second mechanical output (12a). At least one of the first and the second mechanical outputs can be used to drive the compressor (14). At least one of the first and the second mechanical outputs can be used to drive the fresh water pump (38).

It is further contemplated that the fresh water pump (38) can be exchanged for a secondary compressor (also configured to pump fluid), depending on the volume of the fresh water outlet (20).

It will be appreciated by persons skilled in the art that numerous variations and modifications may be made to the above-described embodiments, without departing from the scope of the following claims. The present embodiments are, therefore, to be considered in all respects as illustrative of the scope of protection, and not restrictively.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

As used herein and in the appended claims, the singular form of a word includes the plural, unless the context clearly dictates otherwise. Thus, the references "a," "an" and "the" are generally inclusive of the plurals of the respective terms. For example, reference to "a feature" includes a plurality of such "features." The term "and/or" used in the context of "X and/or Y" should be interpreted as "X," or "Y," or "X and Y.

It is to be understood that, if any prior art publication is referred to herein, such reference does not constitute an admission that the publication forms a part of the common general knowledge in the art, in Australia or any other country.

In the claims which follow and in the preceding description of the disclosure, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosure.

LEGEND

| No. | Description | No. | Description |
|---|---|---|---|
| 100 | Geothermal desalination system | 404 | Start-up step |
| 101 | Geothermal desalination and salt water delivery system | 102 | Geothermal desalination and pumping system |
| 1 | Primary liquid circuit | 31 | Compressed air line 3 |
| 2 | Secondary liquid circuit | 32 | Compressed air line 4 |
| 3 | Primary liquid - water | 33 | Working medium |
| 4 | Heated water | 34 | Heated working medium |
| 5 | Geothermal well | 36a | ORC Circuit pump |
| 6 | Steam | 36b | Primary circuit start-up pump |
| 7 | Well head | 37 | Air storage tank |
| 8 | Residual heated liquid | 38 | Fresh Water pump |
| 9 | Turbine exhaust fluid | 39 | Brine |
| 10 | First turbine | 40 | Desalination plant |
| 12 | Mechanical output | 42 | First chamber |
| 13 | Compressed air line 1 | 43 | Top up water supply |
| 14 | Air compressor | 44 | Last chamber |
| 15 | Compressed air line 2 | 45 | Delivery point |
| 16 | Salt water | 46 | Compressed air line 5 |
| 17 | Salt water bore head | 48 | Brine pump |
| 18 | Salt water bore | 112 | Well inlet |
| 19 | Fresh water | 114 | Well outlet |
| 20 | Fresh water outlet | 120 | Outer casing |
| 21 | Brine outlet | 122 | Inner casing |
| 22 | Air vacuum pump | 170 | First casing |
| 23 | Air brine pump | 172 | Second casing |
| 24 | Vacuum line | 174 | Third casing |
| 25 | Flash separator | 510 | Seals |
| 26 | Drain | 512 | Exterior support collar |
| 27 | Salt water delivery line | 400 | Heating liquid step |
| 28 | Ambient air intake | 401 | Driving turbine step |
| 29 | Air well pump | 402 | Driving compressor step |
| 30 | Heat Exchanger | 403 | Pumping salt water step |

The invention claimed is:

1. A geothermal desalination system, comprising;
a primary liquid circuit circulating a primary liquid into a geothermal well and returning heated liquid from a well head of the geothermal well, the primary liquid circuit passing through a desalination plant;
a first turbine driven by the heated liquid to produce a mechanical output; and
an air compressor driven from the mechanical output to provide a first compressed air supply and a second compressed air supply,
wherein the first compressed air supply drives a supply pump to supply salt water to the desalination plant and the second compressed air supply drives a start-up pump to initiate circulation in the primary liquid circuit.

2. The system of claim 1, wherein a portion of the heated liquid is subject to pressure change to produce steam to drive the first turbine.

3. The system of claim 2, wherein the heated liquid is subject to pressure change in a separator.

4. The system of claim 3, wherein a portion of the liquid in the primary liquid circuit is outputted from the separator and mixed with liquid in the primary circuit exhausted from the first turbine to increase the temperature of the liquid in the primary liquid circuit.

5. The system of claim 1, wherein the liquid in the primary liquid circuit is communicated to the desalination plant downstream of the first turbine before returning to the geothermal bore to be reheated.

6. The system of claim 1, wherein circulation of the primary liquid circuit once initiated by the start-up pump is sustained by a thermal Syphoning effect drawing liquid into the geothermal well at a first temperature as heated liquid is forced out of the well head at a second temperature, greater than the first temperature.

7. A geothermal desalination system, comprising:
a primary liquid circuit circulating a primary liquid into a geothermal well and returning heated liquid from a well head of the geothermal well;
the heated liquid being fed to a heat exchanger to heat a working medium of a secondary circuit passing through a desalination plant, wherein the heated working medium of the secondary circuit drives a first turbine to produce a mechanical output,
an air compressor driven from the mechanical output to provide a first compressed air supply and a second compressed air supply,
wherein the first compressed air supply drives a supply pump to supply salt water to the desalination plant, and the second compressed air supply drives a start-up pump to initiate circulation in at least one of the primary liquid circuit and the secondary circuit.

8. The system of claim 7, wherein the working medium in the secondary circuit is a binary fluid having a low-boiling point.

9. The system of claim 7, wherein the working medium of the secondary circuit is selected from: water; distilled water; and N-pentane.

10. The system of claim 7, wherein the working medium of the secondary circuit is communicated to the desalination plant before returning to the heat exchanger to be re-heated.

11. The system of claim 7, further comprising a second turbine driven by either of the heated liquid of the primary liquid circuit or the heated working medium of the secondary circuit, to produce a second mechanical output, wherein the second mechanical output drives a fresh water pump configured to pump fresh water from the desalination plant to a delivery outlet.

12. The system of claim 11, wherein a portion of the heated liquid can be subject to pressure change to produce steam to drive at least one of the first turbine and the second turbine.

13. The system of claim 11, wherein the liquid in the primary liquid circuit is communicated to the desalination plant downstream of each of the first and second turbines before returning to the geothermal well to be reheated.

14. The system of claim 1, wherein the first compressed air supply drives the supply pump located within any one of: a salt water bore; a salt water body; a salt water storage tank; or a salt water dam, to supply salt water to the desalination plant.

15. The system of claim 7, wherein the salt water is introduced into a first chamber of the desalination plant, the first chamber heated by the flow of heated liquid from the primary liquid circuit or the flow of heated fluid medium from the secondary circuit.

16. The system of claim 1, wherein the air compressor provides a third compressed air supply configured to drive a brine pump to pump brine away from the desalination plant.

17. The system of claim 7, wherein the air compressor provides a fourth compressed air supply configured to drive a circuit pump to pump the fluid medium around the secondary circuit.

18. The system of claim 16, wherein an air storage tank is incorporated within at least one of the first, second, third and fourth compressed air supplies, to store compressed air.

19. The system of claim 1, wherein an air vacuum pump is connected upstream of the air compressor, such that the air vacuum pump is driven by a flow of ambient air drawn into the air compressor.

20. The system of claim 19, wherein a vacuum line is connected to the vacuum pump, to drawn air from at least one chamber of the desalination plant.

21. The system of claim 1, wherein the supply pump is an air pump.

22. The system of claim 1, wherein the liquid in the primary liquid circuit is water or distilled water.

23. A method of feeding salt water to a desalination plant using compressed air, powered by geothermal energy, comprising the steps:
   feeding a primary liquid into a geothermal well and drawing heated liquid from the well head of the geothermal well to form a primary liquid circuit, the primary liquid circuit passing through a desalination plant;
   communicating the heated liquid from the primary liquid circuit to a first turbine to produce a mechanical output; and
   connecting the mechanical output to an air compressor to produce a first and a second compressed air supply,
   wherein the first compressed air supply is configured to drive a supply pump to supply salt water to the desalination plant and the second compressed air supply drives a start-up pump to initiate the primary liquid circuit.

24. The method of claim 23, further comprising the step of pumping brine away from the desalination plant with a brine pump driven off a third compressed air supply from the compressor.

25. The method of claim 23, further comprising the step of communicating heat from the heated liquid of the primary liquid circuit to a second turbine to produce a second mechanical output, the second mechanical output driving a fresh water pump configured to pump fresh water from the desalination plant to a delivery outlet.

26. The method of claim 23, driving the first turbine directly off the heated liquid of the primary liquid circuit.

27. The method of claim 25, further comprising the step of driving at least one of the first turbine and the second turbine of a secondary circuit in which heat from the heated liquid of the primary liquid circuit provides heat to a working medium of the secondary circuit to drive at least one of the first turbine and the second turbine.

28. The method of claim 27, effecting heat transfer between the primary liquid circuit and the secondary circuit via a heat exchanger.

29. The method of claim 23, wherein the primary liquid in the primary liquid circuit is water or distilled water.

30. The method of claim 23, further comprising the step of drawing ambient air through the air compressor via a vacuum pump to thereby drive the vacuum pump.

31. The method of claim 30, further comprising the step of using the vacuum pump to draw air from a chamber of the desalination plant to create a vacuum therein.

32. The method of claim 23, wherein the first turbine comprises a series of turbines.

33. The method of claim 27, further comprising the step of pumping the working medium around the secondary circuit with a circuit pump driven off a fourth compressed air supply from the compressor.

\* \* \* \* \*